(12) United States Patent
Funasaka et al.

(10) Patent No.: US 11,047,375 B2
(45) Date of Patent: Jun. 29, 2021

(54) DIAPHRAGM-TYPE COMPRESSOR, COOLER, PROJECTOR, AND METHOD FOR COMPRESSING FLUID

(71) Applicant: Seiko Epson Corporation, Tokyo (JP)

(72) Inventors: Tsukasa Funasaka, Shiojiri (JP); Yuki Hanamura, Azumino (JP)

(73) Assignee: Seiko Epson Corporation

( * ) Notice: Subject to any disclaimer, the term of this patent is extended or adjusted under 35 U.S.C. 154(b) by 8 days.

(21) Appl. No.: 16/525,750

(22) Filed: Jul. 30, 2019

(65) Prior Publication Data
US 2020/0040885 A1 Feb. 6, 2020

(30) Foreign Application Priority Data
Jul. 31, 2018 (JP) .............................. JP2018-143268

(51) Int. Cl.
| | | |
|---|---|---|
| *F04B 43/04* | (2006.01) | |
| *F04B 53/08* | (2006.01) | |
| *G03B 21/16* | (2006.01) | |
| *F04B 45/047* | (2006.01) | |

(52) U.S. Cl.
CPC .......... *F04B 43/046* (2013.01); *F04B 45/047* (2013.01); *F04B 53/08* (2013.01); *G03B 21/16* (2013.01)

(58) Field of Classification Search
CPC ........ F04B 3/064; F04B 43/02; F04B 43/028; F04B 43/009; F04B 43/043; F04B 43/046; F04B 53/08; F04B 45/04; F04B 45/045; F04B 45/047; G03B 21/16; F25B 2400/15; H04N 9/3144
USPC .................................................. 417/366–371
See application file for complete search history.

(56) References Cited

U.S. PATENT DOCUMENTS

| | | | | |
|---|---|---|---|---|
| 6,598,409 | B2 * | 7/2003 | Shyy ......................... | F25B 1/02 62/115 |
| 2005/0144968 | A1 * | 7/2005 | Shakespeare ........... | F25B 13/00 62/298 |
| 2011/0076170 | A1 * | 3/2011 | Fujisaki ................ | F04B 43/046 417/415 |
| 2014/0178220 | A1 | 6/2014 | Fujisaki et al. | |

FOREIGN PATENT DOCUMENTS

| | | |
|---|---|---|
| DE | 102012018029 A1 | 3/2014 |
| FR | 2554516 A1 | 5/1985 |
| JP | 2009-097415 A | 5/2009 |

* cited by examiner

*Primary Examiner* — Kenneth J Hansen
(74) *Attorney, Agent, or Firm* — Harness, Dickey & Pierce, P.L.C.

(57) ABSTRACT

A diaphragm-type compressor includes a substrate, an actuator, a diaphragm provided between the substrate and the actuator, and a case in which the diaphragm, the actuator, and the substrate are provided. A recessed section formed at the actuator side of the substrate and the actuator overlap in a plan view. The case has an inflow port of fluid further on the actuator side than the substrate based on the position of the diaphragm. The substrate includes a suction port for causing the recessed section to suck the fluid.

7 Claims, 7 Drawing Sheets

DIAPHRAGM-TYPE COMPRESSOR, COOLER, PROJECTOR, AND METHOD FOR COMPRESSING FLUID

The present application is based on, and claims priority from, JP Application Serial Number 2018-143268, filed Jul. 31, 2018, the disclosure of which is hereby incorporated by reference herein in its entirety.

BACKGROUND

1. Technical Field

The present disclosure relates to a diaphragm-type compressor, a cooler, a projector, and a method for compressing fluid.

2. Related Art

Various compressors have been used. Among such compressors, there is a diaphragm-type compressor that causes a diaphragm to reciprocate to transfer fluid.

For example, JP-A-2009-97415 (Patent Literature 1) discloses a diaphragm-type compressor that causes, with a hydraulic fluid port functioning as an actuator, a diaphragm to reciprocate to transfer fluid.

However, in the diaphragm-type compressor in the past described in Patent Literature 1, the actuator sometimes rises in temperature because the reciprocation of the diaphragm by driving of the actuator is repeated.

SUMMARY

A diaphragm-type compressor according to an aspect of the present disclosure includes: a substrate; an actuator; a diaphragm provided between the substrate and the actuator and partitioning the substrate and a compression chamber (a recessed section); and a case in which the diaphragm, the actuator, and the substrate are provided. The case has an inflow port of fluid. The substrate includes a suction port for causing the compression chamber (the recessed section) to suck the fluid. The actuator is a member configuring a moving path of the fluid from the inflow port to the suction port.

BRIEF DESCRIPTION OF THE DRAWINGS

FIG. 2 is a perspective view showing the diaphragm-type compressor according to the first embodiment of the present disclosure and is a perspective view of a state in which a part of the case is seen through.

FIG. 6 is a schematic diagram showing the diaphragm-type compressor according to the second embodiment of the present disclosure and is a plan sectional view taken along a Y-Y line of FIG. 5 showing a state in which a part of a case is seen through.

FIG. 7 is a schematic diagram showing the diaphragm-type compressor according to the second embodiment of the present disclosure and is a plan sectional view taken along an X-X line of FIG. 5 showing a state in which the part of the case is seen through.

DESCRIPTION OF EXEMPLARY EMBODIMENTS

Figure 1:
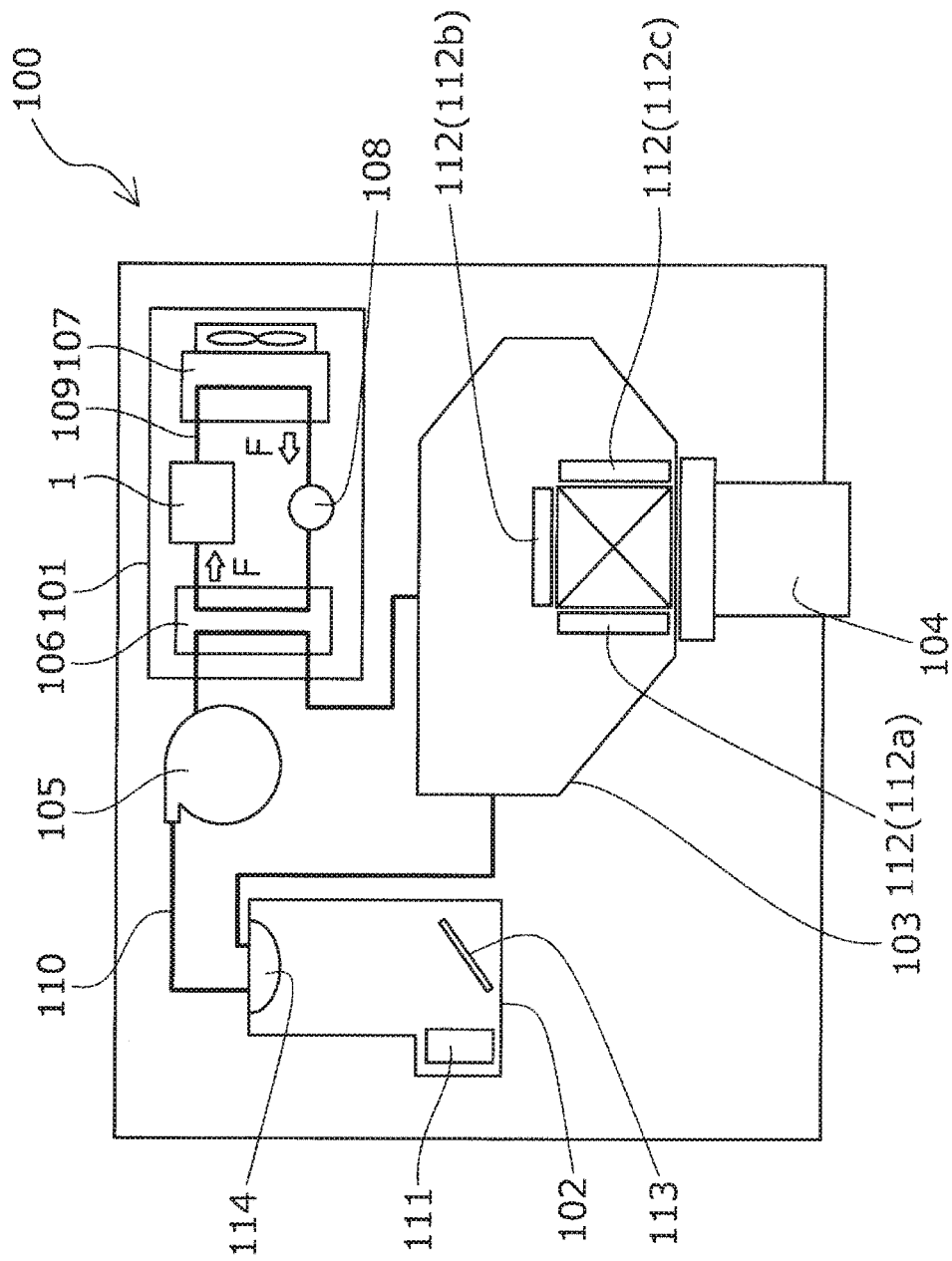
FIG. 1 is a schematic diagram showing an example of use of a diaphragm-type compressor according to a first embodiment of the present disclosure.

First, the present disclosure is schematically explained.

A diaphragm-type compressor according to a first aspect of the present disclosure includes a substrate, an actuator, a diaphragm provided between the substrate and the actuator and partitioning the substrate and a compression chamber, and a case in which the diaphragm, the actuator, and the substrate are provided. The case has an inflow port of fluid. The substrate includes a suction port for causing the compression chamber to suck the fluid. The actuator is a member configuring a moving path of the fluid from the inflow port to the suction port.

According to this aspect, since the actuator is the member configuring the moving path of the fluid from the inflow port to the suction port, it is possible to directly cool the actuator with the fluid. Therefore, it is possible to suppress a temperature rise of the actuator.

A diaphragm-type compressor according to a second aspect of the present disclosure includes a substrate, an actuator, a diaphragm provided between the substrate and the actuator and partitioning the substrate and a compression chamber (a recessed section), and a case in which the diaphragm, the actuator, and the substrate are provided. The case has an inflow port of fluid. The substrate includes a suction port for causing the compression chamber (the recessed section) to suck the fluid. A wall made of metal is formed between the actuator and a moving path of the fluid from the inflow port to the suction port.

According to this aspect, the wall made of metal is formed in a position between the actuator and the moving path of the fluid from the inflow port to the suction port. Since the metal has high thermal conductivity, it is possible to cool the actuator with the fluid indirectly via the wall made of the metal. Therefore, it is possible to suppress a temperature rise of the actuator.

In a third aspect of the present disclosure, the diaphragm-type compressor according to the first or second aspect includes a diffusing member configured to diffuse the fluid flowing in from the inflow port.

According to this aspect, since the diaphragm-type compressor includes the diffusing member configured to diffuse the fluid flowing in from the inflow port, it is possible to efficiently cool the actuator with the diffused fluid. Therefore, it is possible to efficiently suppress a temperature rise of the actuator.

In a fourth aspect of the present disclosure, in the diaphragm-type compressor according to any one of the first to third aspects, the actuator is a piezoelectric element.

According to this aspect, it is possible to simply configure the piezoelectric element that can finely set a pressurizing force by controlling an applied voltage to the actuator. It is possible to simply configure the diaphragm-type compressor capable of compressing the fluid at different compression ratios.

A cooler according to a fifth aspect of the present disclosure includes the diaphragm-type compressor according to any one of the first to fourth aspects, a heat exchanging section configured to radiate heat of a coolant that rises in temperature by being compressed by the diaphragm-type compressor, and a coolant expanding section configured to expand the coolant.

According to this aspect, it is possible to suppress a temperature rise of the actuator.

A projector according to a sixth aspect of the present disclosure includes the cooler according to the sixth aspect.

According to this aspect, it is possible to project a video with the projector in which a temperature rise of the actuator is suppressed.

A method for compressing fluid according to a seventh aspect of the present disclosure is a method of compressing fluid using a diaphragm-type compressor including a diaphragm, an actuator configured to apply a force to the diaphragm, a substrate partitioning the diaphragm and a compression chamber (a recessed section), and a case which has an inflow port of fluid and in which the diaphragm, the actuator, and the substrate are provided. The method includes an inflow step of causing the fluid to flow into the inside of the case from the inflow port, a heat transfer step of transferring heat from the actuator to the fluid flowing in from the inflow port, a suction step of causing the compression chamber (the recessed section) to suck the fluid to which the heat is transferred from the actuator, and a compression step of compressing the fluid sucked by the compression chamber (the recessed section).

According to this aspect, since the heat is transferred from the actuator to the fluid flowing in from the inflow port, it is possible to cool the actuator with the fluid. Therefore, it is possible to suppress a temperature rise of the actuator.

Diaphragm-type compressors according to embodiments of the present disclosure are explained in detail below with reference to the accompanying drawings.

First Embodiment (FIGS. 1 to 4)

A diaphragm-type compressor 1 according to a first embodiment of the present disclosure is explained.

First, a projector 100, which is an example of an apparatus including the diaphragm-type compressor 1 according to the first embodiment of the present disclosure, is explained with reference to FIG. 1.

The projector 100 shown in FIG. 1 includes a light source unit 102 including a light source 114, a phosphor 111, and a dichroic mirror 113. The projector 100 includes an optical element unit 103 including an optical element 112 including an optical element 112a for red light, an optical element 112b for green light, and an optical element 112c for blue light and a projection lens 104. The projector 100 includes a cooler 101 for cooling the light source unit 102 and the optical element unit 103.

The cooler 101 includes the diaphragm-type compressor 1 according to this embodiment, details of which are explained below, a heat exchanging section 107, a coolant expanding section 108, and an evaporator 106. The cooler 101 is configured such that a primary coolant flows in a direction F in a primary coolant pipe 109. Since such a configuration is adopted, the cooler 101 can suppress a temperature rise of an actuator explained below.

The primary coolant is compressed by the diaphragm-type compressor 1 and rises in temperature. The primary coolant flowing into the diaphragm-type compressor 1 is low-pressure gas. The primary coolant flowing out from the diaphragm-type compressor 1 is high-pressure gas.

The primary coolant compressed by the diaphragm-type compressor 1 is cooled to a predetermined temperature by the heat exchanging section 107. The primary coolant cooled by the heat exchanging section 107 is high-pressure liquid.

The primary coolant cooled by the heat exchanging section 107 is expanded by the coolant expanding section 108 and the temperature of the primary coolant drops. The primary coolant expanded by the coolant expanding section 108 is low-pressure liquid.

The evaporator 106 changes the primary coolant from liquid to gas on the inside of the evaporator 106 and absorbs heat on the inside of the evaporator 106. The light source unit 102, the optical element unit 103, and the cooler 101 are coupled by a secondary coolant pipe 110. The secondary coolant is circulated in the secondary coolant pipe 110 by a liquid feeding pump 105. The primary coolant pipe 109 and the secondary coolant pipe 110 are disposed side by side on the inside of the evaporator 106 of the cooler 101. Since the evaporator 106 has such an internal configuration, the secondary coolant is cooled on the inside of the evaporator 106, the temperature of which drops because the primary coolant is changed from liquid to gas. The cooled secondary coolant circulates in the light source unit 102 and the optical element unit 103, whereby the light source unit 102 and the optical element unit 103 are cooled.

As explained above, the diaphragm-type compressor 1 according to this embodiment can be suitably used in the projector 100. Since the projector 100 shown in FIG. 1 includes the diaphragm-type compressor 1 according to this embodiment explained in detail below, the projector 100 is configured to be able to suppress a temperature rise of the actuator of the diaphragm-type compressor 1. Therefore, it is possible to project a video with the projector 100 according to this embodiment in which a temperature rise of the actuator is suppressed.

However, the diaphragm-type compressor according to the present disclosure is not limited to the use in the projector and can be used in an apparatus or the like including a constituent member that generates heat such as a printer, a computer (a notebook personal computer, a desktop computer, etc.), and a robot.

The configuration of the diaphragm-type compressor 1 is explained in detail with reference to FIGS. 2 and 3.

Figure 2:
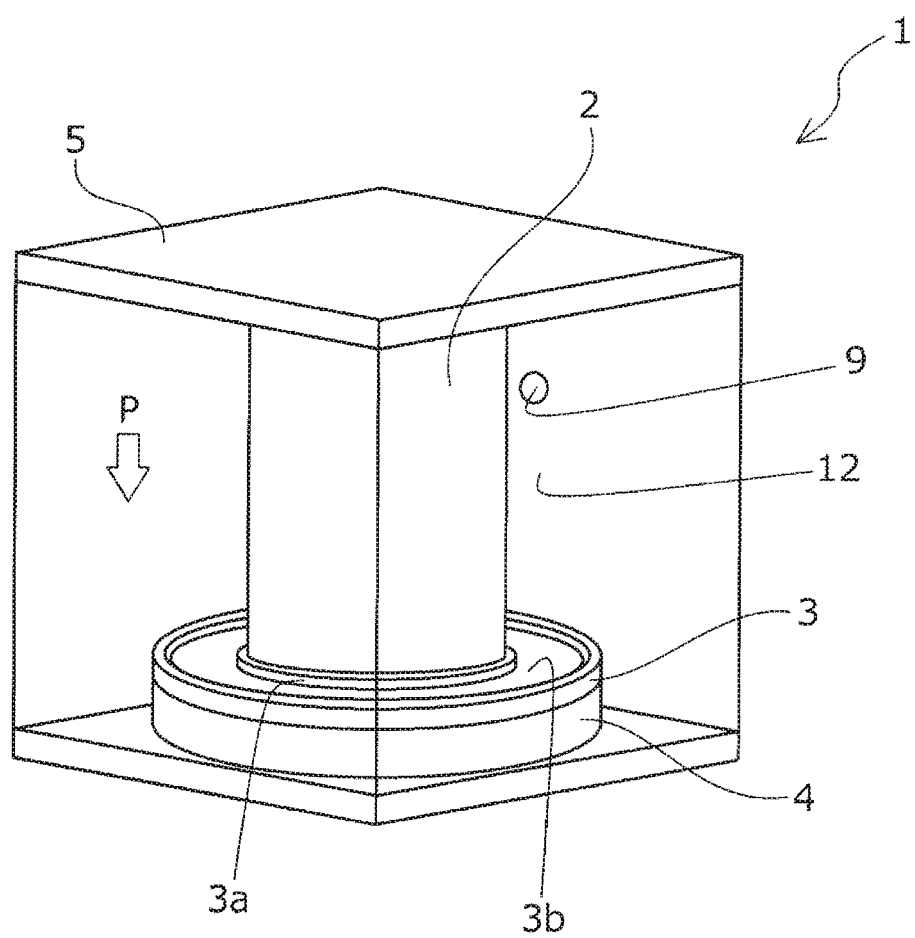
Figure 3:
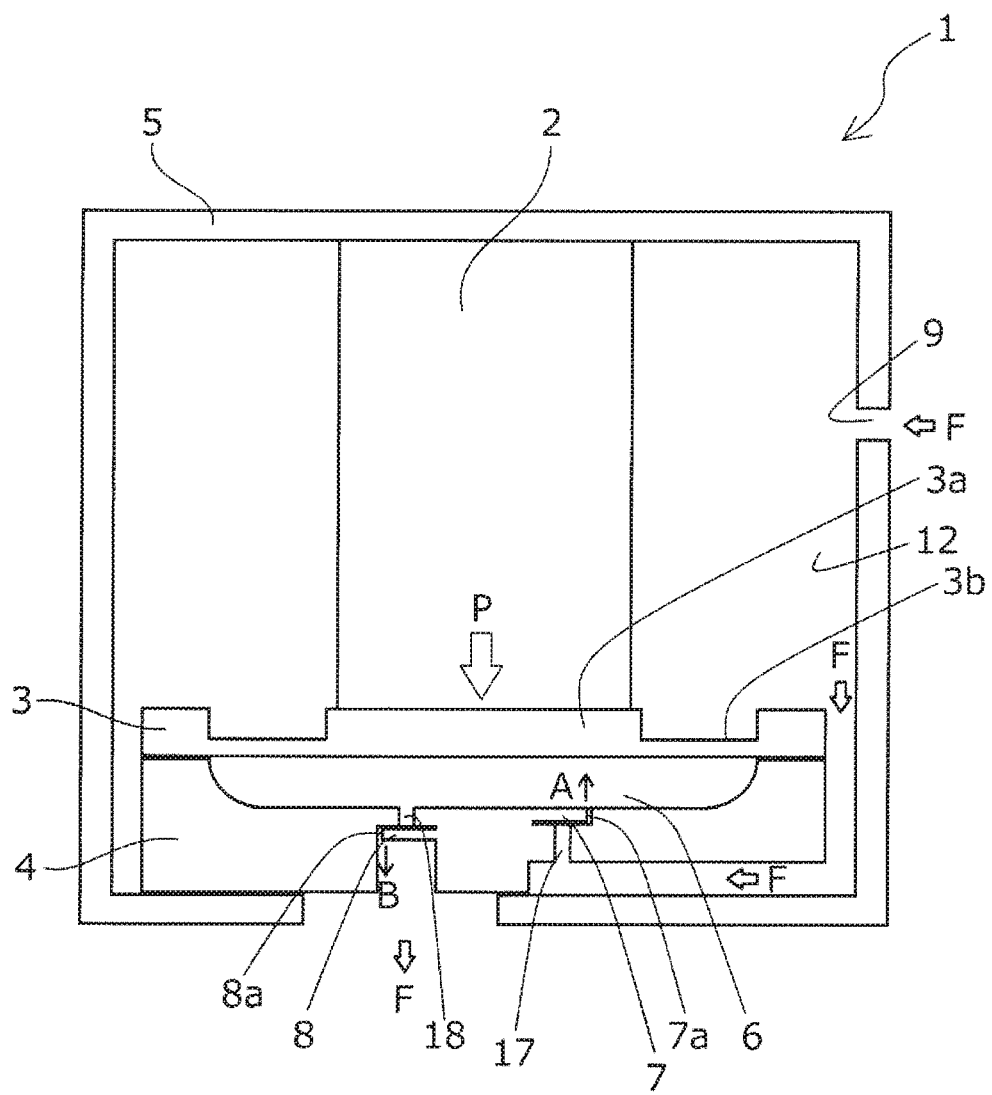
FIG. 3 is a schematic sectional view showing the diaphragm-type compressor according to the first embodiment of the present disclosure.

As shown in FIGS. 2 and 3, the diaphragm-type compressor 1 according to this embodiment includes an actuator 2, a diaphragm 3 coupled to the actuator 2, a substrate 4 coupled to the diaphragm 3, and a case 5 that covers the actuator 2, the diaphragm 3, and the substrate 4. The case 5 includes an inflow port 9 of the primary coolant, which is fluid, further on the actuator 2 side than the substrate 4 based on the position of the diaphragm 3 in a pressing direction P. The actuator 2 according to this embodiment is a piezoelectric element and is coupled to a not-shown amplifier coupled to a not-shown signal generator. The actuator 2 is configured to be capable of pressing the diaphragm 3 in the pressing direction P by driving the signal generator and the amplifier. A driving wave motion of the actuator 2 by the signal generator and the amplifier can be, for example, a Sin wave. The actuator 2 tends to be continuously driven to rise in temperature. The pressing direction P corresponds to a direction in which the diaphragm 3 is displaced according to the driving of the actuator 2.

As shown in FIGS. 2 and 3, in the pressing direction P, the diaphragm 3 is configured thicker in a region 3a pressed by the actuator 2 than a region 3b not pressed by the actuator 2. "The region 3a pressed by the actuator 2 is thicker in the pressing direction P than the region 3b not pressed by the actuator 2" means that at least a part of a position pressed by the actuator 2 only has to be thicker in the pressing direction P than at least a part of a position not pressed by the actuator 2.

As shown in FIG. 3, in the substrate 4, a hollow is formed at a side in contact with the diaphragm 3. The hollow forms a compression chamber (a recessed section) 6 by joining the diaphragm 3 and the substrate 4.

In a position overlapping the actuator 2 in the pressing direction P in the substrate 4, a suction port 17 for enabling the primary coolant, which is fluid, to flow into the compression chamber (the recessed section) 6 is formed. A suction valve 7 is formed in the suction port 17. The suction valve 7 is capable of changing the position of an outer side portion 7a in the pressing direction P between when the primary coolant is allowed to flow into the compression chamber (the recessed section) 6 and when the primary coolant is not allowed to flow into the compression chamber (the recessed section) 6. The suction valve 7 changes the position in the pressing direction P to allow the primary coolant to flow in only the direction F and prevent the primary coolant from flowing back. The substrate 4 is formed by stacking a plurality of tabular materials along the pressing direction P and joining the plurality of tabular materials. The suction valve 7 is configured integrally with the tabular materials. The valve 7 changes the position of the outer side portion 7a in an opening direction A from a state of suppression of backflow of the primary coolant shown in FIG. 3 to enable the primary coolant to flow into the compression chamber (the recessed section) 6.

In a position overlapping the actuator 2 in the pressing direction P in the substrate 4, a discharge port 18 for enabling the primary coolant from flowing out from the compression chamber (the recessed section) 6 is formed. A discharge valve 8 is formed in the discharge port 18. The discharge valve 8 is capable of changing the position of an outer side portion 8a in the pressing direction P between when the primary coolant flows out from the compression chamber (the recessed section) 6 and when the primary coolant does not flow out from the compression chamber (the recessed section) 6. The discharge valve 8 changes the position in the pressing direction P to allow the primary coolant to flow in only the direction F and prevent the primary coolant from flowing back. Like the suction valve 7, the discharge valve 8 is configured integrally with the tabular materials configuring the substrate 4. The discharge valve 8 changes the position of the outer side portion 8a to an opening direction B from the state of suppression of backflow of the primary coolant shown in FIG. to enable the primary coolant to flow out from the compression chamber 6.

As explained above, the substrate 4 is formed by stacking the plurality of tabular materials along the pressing direction P and joining the plurality of tabular materials. However, the configuration of the substrate 4 is not limited to such a configuration. The shapes of the suction valve 7 and the discharge valve 8 are not limited to the shapes in this embodiment and may be, besides a cantilever beam shape in this embodiment, a double-supported beam shape and a circular shape.

As explained above, the inflow port 9 of the primary coolant is formed in the case 5. The primary coolant flowing into the inside of the case 5 from the inflow port 9 is capable of coming into contact with the actuator 2 on the inside of the case 5. In other words, the actuator 2 is a member configuring a moving path 12 of the primary coolant from the inflow port 9 to the suction port 17. In the diaphragm-type compressor 1 according to this embodiment, the primary coolant flowing into the inside of the case 5 from the inflow port 9 comes into contact with the actuator 2 and heat is transferred to the primary coolant from the actuator 2. Then, the primary coolant is sent to the compression chamber (the recessed section) 6 via the suction port 17. "The moving path of the primary coolant" means all paths in which the primary coolant could pass.

To once summarize the above, the diaphragm-type compressor 1 according to this embodiment includes the substrate 4, the actuator 2, the diaphragm 3 provided between the substrate 4 and the actuator 2 and partitioning the substrate 4 and the compression chamber (the recessed section) 6, and the case 5 on the inside of which the diaphragm 3, the actuator 2, and the substrate 4 are provided. In other words, the diaphragm-type compressor 1 according to this embodiment includes the diaphragm 3, the actuator 2 capable of pressing the diaphragm 3, the substrate 4 provided at the opposite side of the actuator 2 with respect to the diaphragm 3 and forming the compression chamber (the recessed section) 6 in conjunction with the actuator 2, and the case 5 on the inside of which the diaphragm 3, the actuator 2, and the substrate 4 are provided. The case 5 includes the inflow port 9 of the primary coolant further on the actuator 2 side than the substrate 4 based on the position of the diaphragm 3. The substrate 4 includes the suction port 17 for causing the compression chamber (the recessed section) 6 to suck the primary coolant flowing in from the inflow port 9. The actuator 2 is formed in the moving path 12 of the primary coolant from the inflow port 9 to the suction port 17.

In this way, in the diaphragm-type compressor 1 according to this embodiment, since the actuator 2 is the member configuring the moving path 12 of the primary coolant from the inflow port 9 to the suction port 17, the diaphragm-type compressor 1 is configured to be capable of directly cooling the actuator 2 with the primary coolant. Therefore, the diaphragm-type compressor 1 according to this embodiment is capable of suppressing a temperature rise of the actuator 2.

Figure 4:
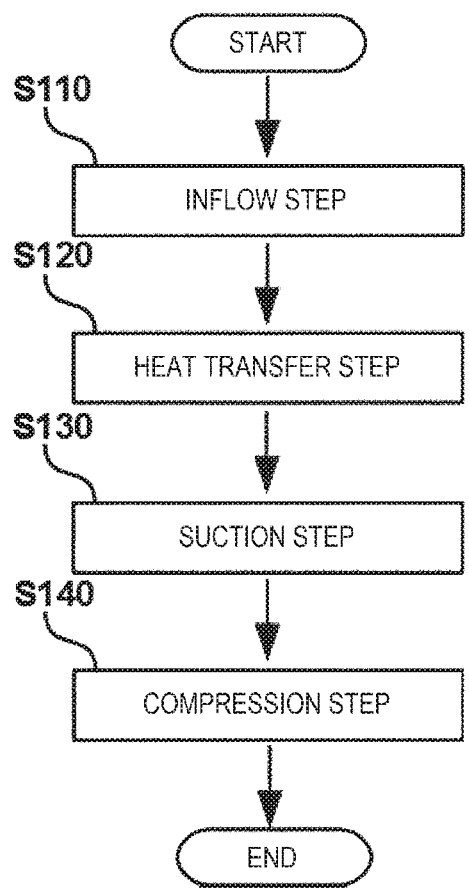
FIG. 4 is a flowchart showing an example of a method for compressing fluid executable using the diaphragm-type compressor according to the first embodiment of the present disclosure.

From the viewpoint of a method for compressing the primary coolant (the fluid), concerning the above explanation, it is possible to execute the following method for compressing fluid represented by a flowchart of FIG. 4 using the diaphragm-type compressor 1 including the diaphragm 3, the actuator 2 that applies a force to the diaphragm 3, and the substrate 4 provided at the opposite side of the actuator 2 with respect to the diaphragm 3 and partitioning the actuator 2 and the compression chamber (the recessed section) 6. First, in an inflow step of step S110, the primary coolant is caused to flow into the inside of the case 5 from the inflow port 9. Subsequently, in a heat transfer step of step S120, heat is transferred from the actuator 2 to the primary coolant flowing in from the inflow port 9. Subsequently, in a suction step of step S130, the compression chamber (the recessed section) 6 is caused to suck the primary coolant to which the heat is transferred from the actuator 2. In a compression step of step S140, the primary coolant sucked by the compression chamber (the recessed section) 6 is compressed. The compressed primary coolant is discharged from the discharge port 18 to end the method for compressing fluid according to this embodiment.

The inflow step, the heat transfer step, the suction step, and the compression step explained above are executed by executing the method for compressing fluid according to this embodiment. Consequently, since heat is transferred from the actuator 2 to the primary coolant flowing in from the inflow port 9, it is possible to cool the actuator 2 with the primary coolant. Therefore, it is possible to suppress a temperature rise of the actuator 2 by executing the method for compressing fluid according to this embodiment.

As explained above, in the diaphragm-type compressor 1 according to this embodiment, the actuator 2 is the piezoelectric element. Therefore, since the actuator is simply configured by the piezoelectric element, the diaphragm-type compressor 1 capable of compressing the primary coolant at different compression ratios is simply configured.

Figure 5:
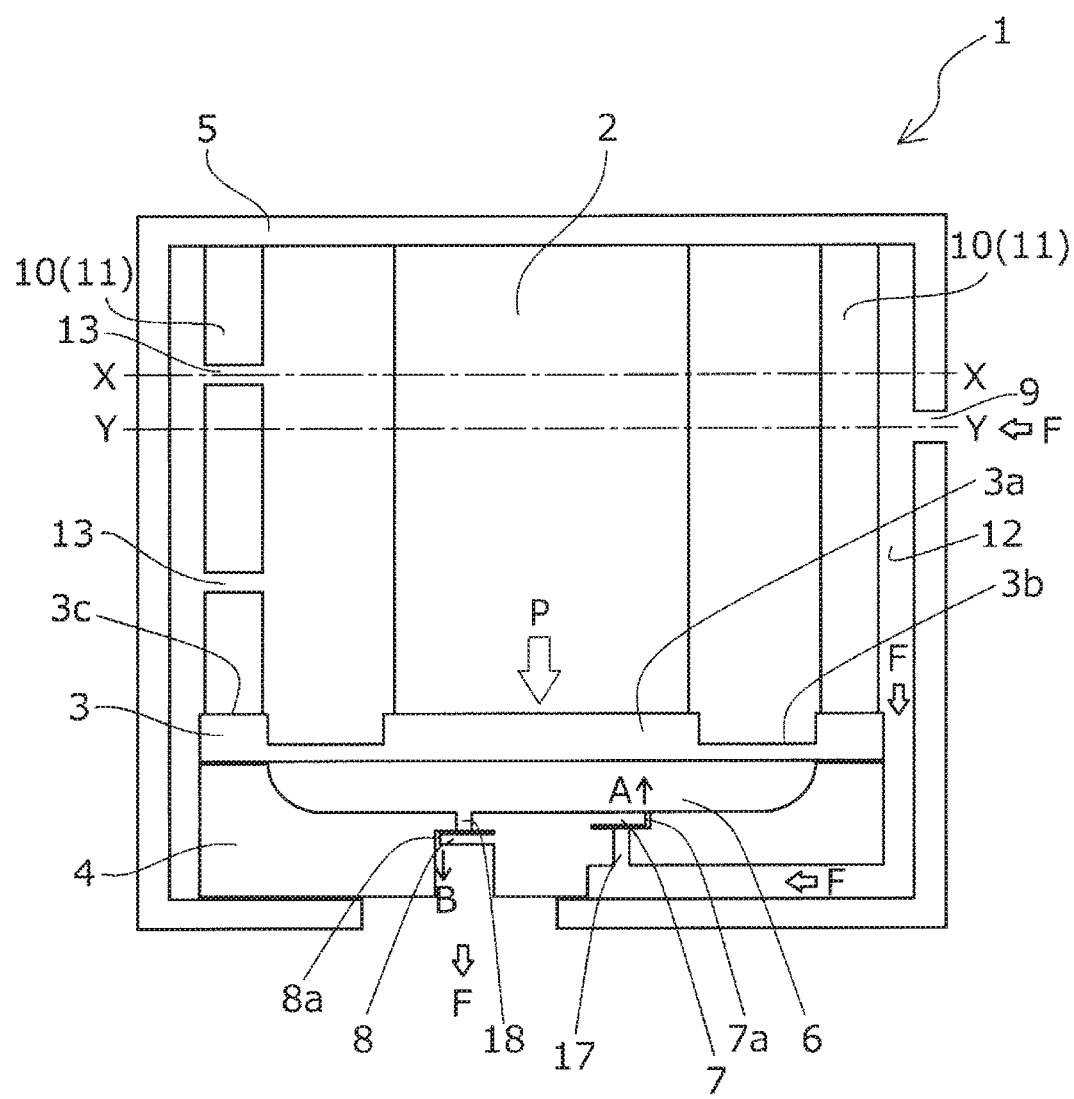
FIG. 5 is a schematic sectional view showing a diaphragm-type compressor according to a second embodiment of the present disclosure.
Figure 6:
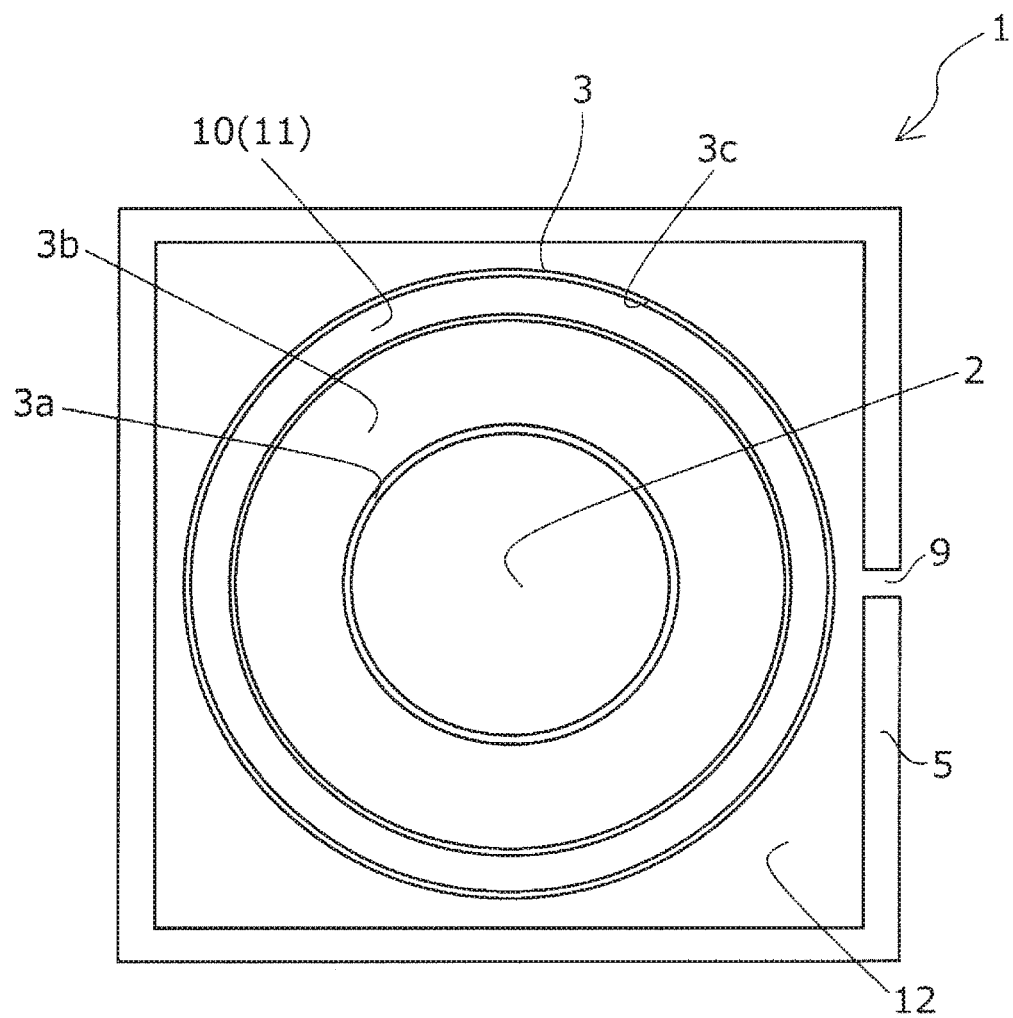
Figure 7:
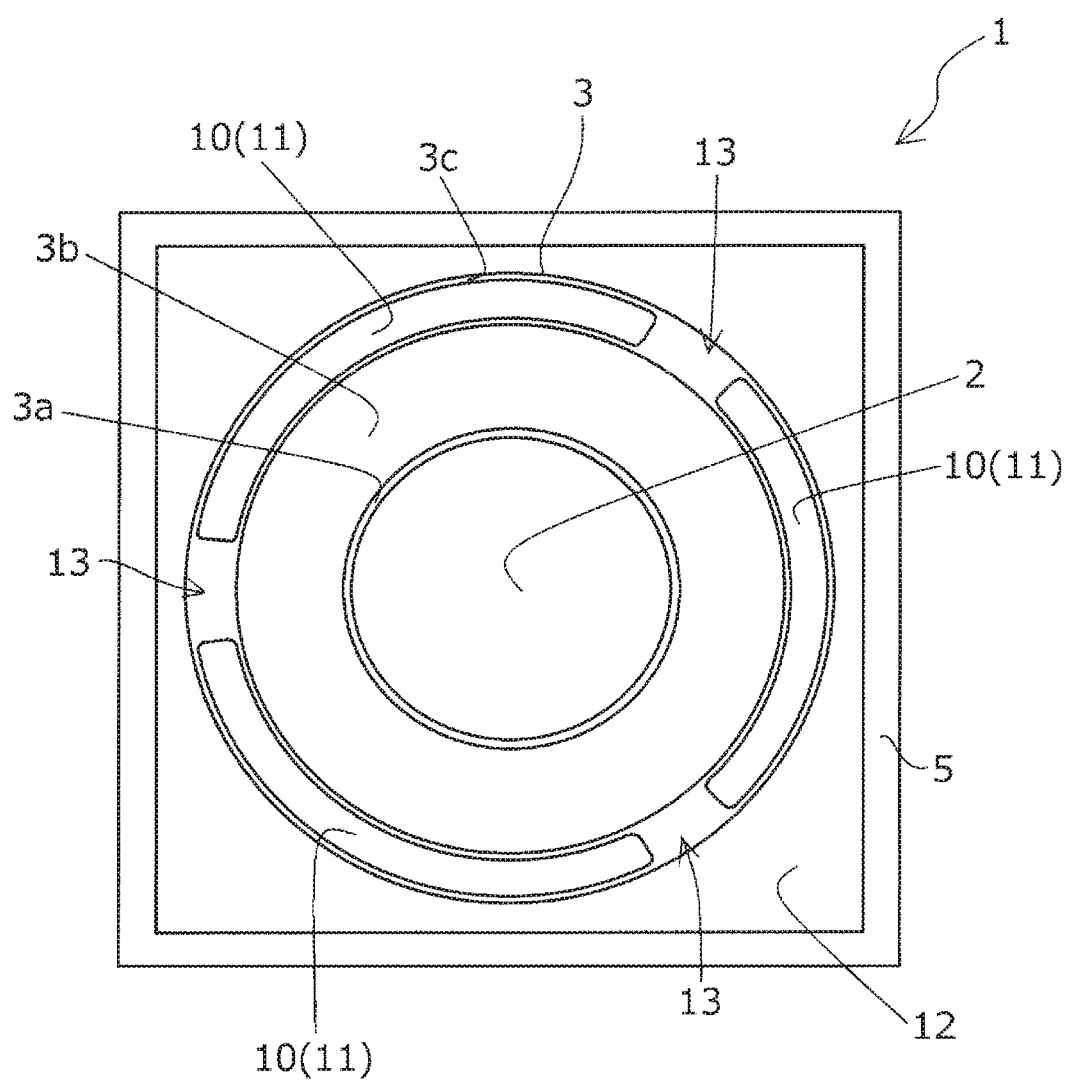

Second Embodiment (FIGS. 5 to 7)

The diaphragm-type compressor 1 according to a second embodiment of the present disclosure is explained with reference to FIGS. 5 to 7. FIG. 5 is a diagram corresponding to FIG. 3 showing the diaphragm-type compressor 1 according to the first embodiment. Both of FIGS. 6 and 7 are plan sectional views of the diaphragm-type compressor 1 according to this embodiment. FIG. 6 is a sectional view in a position of a Y-Y line, that is, the inflow port 9 in FIG. 5. FIG. 7 is a sectional view in a position of an X-X line, that is, a slit 13 explained below in FIG. 5. Constituent members common to the first embodiment are denoted by the same reference numerals and signs. Detailed explanation of the constituent members is omitted. The diaphragm-type compressor 1 according to this embodiment has the same configuration as the diaphragm-type compressor 1 according to the first embodiment except that a wall 10 made of metal is formed in the inside of the case 5.

As shown in FIG. 5 and the like, like the diaphragm-type compressor 1 according to the first embodiment, the diaphragm-type compressor 1 according to this embodiment includes the diaphragm 3, the actuator 2 capable of pressing the diaphragm 3, the substrate 4 provided at the opposite side of the actuator 2 with respect to the diaphragm 3 and forming the compression chamber (the recessed section) 6 in conjunction with the actuator 2, and the case 5 on the inside of which the diaphragm 3, the actuator 2, and the substrate 4 are provided. The case 5 includes the inflow port 9 of the primary coolant further on the actuator 2 side than the substrate 4 based on the position of the diaphragm 3. The substrate 4 includes the suction port 17 for causing the compression chamber (the recessed section) 6 to suck the primary coolant flowing in from the inflow port 9. On the other hand, in the diaphragm-type compressor 1 according to this embodiment, as shown in FIGS. 5 and 6, the wall 10 made of the metal is formed in a position above an end portion 3c of the diaphragm 3 between the actuator 2 and the moving path 12 of the primary coolant from the inflow port 9 to the suction port 17.

In this way, in the diaphragm-type compressor 1 according to this embodiment, the wall 10 made of the metal is formed in the position between the actuator 2 and the moving path 12 of the primary coolant from the inflow port 9 to the suction port 17. Since the metal has high thermal conductivity, the diaphragm-type compressor 1 according to this embodiment is capable of cooling the actuator 2 with the primary coolant indirectly via the wall 10 made of the metal. Therefore, the diaphragm-type compressor 1 according to this embodiment is capable of suppressing a temperature rise of the actuator 2.

A constituent material of the wall 10 made of the metal is not particularly limited if the wall 10 is made of metal. However, among metals having high thermal conductivity, aluminum or the like having particularly high thermal conductivity can be suitably used.

In the diaphragm-type compressor 1 according to this embodiment, as shown in FIGS. 5 and 7, a plurality of slits 13 are formed in the wall 10 made of the metal. The wall 10 made of the metal also plays a role of a diffusing member 11 that diffuses the primary coolant flowing into the inside of the case 5 from the inflow port 9 toward the actuator 2.

In this way, since the diaphragm-type compressor 1 according to this embodiment includes the diffusing member 11 that diffuses the primary coolant flowing in from the inflow port 9, the diaphragm-type compressor 1 is configured to be capable of efficiently cooling the actuator 2 with the primary coolant diffused by the diffusing member 11. Therefore, the diaphragm-type compressor 1 according to this embodiment is capable of efficiently suppressing a temperature rise of the actuator 2.

The present disclosure is not limited to the embodiments explained above. Various modifications are possible within the scope of the inventions described in the appended claims. It goes without saying that the modifications are also included in the scope of the present disclosure. For example, the shape of the actuator 2, the shape of the case 5, and the like are not limited to the configurations of the embodiments. For example, an actuator having a quadrangular prism shape may be used instead of the actuator 2 having a columnar shape. A case having a columnar shape as an external shape may be used instead of the case 5 having a quadrangular prism shape as an external shape. For example, the wall 10 made of the metal and the diffusing member 11 may be separately provided. The shapes of the wall 10 made of the metal and the diffusing member 11, the positions, the sizes, the number, and the shapes of the slits 13 of the diffusing member 11, and the like are not particularly limited. Further, for example, the actuator is not limited to the piezoelectric element and can be transformed into a motor, a solenoid, a voice coil motor, and the like, which are included in the scope of the present disclosure.

What is claimed is:

1. A diaphragm compressor comprising:
   a substrate;
   an actuator;
   a diaphragm provided between the substrate and the actuator; and
   a case housing the diaphragm, the actuator, and the substrate, wherein
   a recessed section is formed in the substrate on an actuator side of the substrate, the recessed section and the actuator overlapping in a plan view,
   the diaphragm engages the substrate and partitions the substrate and recessed section from the actuator,
   the case defines an inflow port of fluid, the inflow port being an aperture in a sidewall of the case,
   the substrate defines a suction port in fluid communication with the recessed section, and
   the actuator and case define a moving path of the fluid from the inflow port to the suction port.

2. The diaphragm compressor according to claim 1, further comprising:
   a diffuser configured to diffuse the fluid flowing in from the inflow port, the diffuser being disposed in the moving path.

3. The diaphragm compressor according to claim 2, wherein the diffuser is metal.

4. The diaphragm compressor according to claim 1, wherein the actuator is a piezoelectric element.

5. A cooler comprising:
   the diaphragm compressor according to claim 1;

a heat exchanging section configured to radiate heat of a coolant that rises in temperature by being compressed by the diaphragm compressor; and a coolant expanding section configured to expand the coolant.

6. A projector comprising the cooler according to claim 5, wherein the cooler is coupled to a heat source involved in light emission and a heat source involved in light reception.

7. A method for compressing fluid using a diaphragm compressor including a diaphragm, an actuator configured to apply a force to the diaphragm, a substrate provided via the diaphragm, a recessed section overlapping the actuator in a plan view being provided at the substrate, and a case which has an inflow port of fluid and in which the diaphragm, the actuator, and the substrate are provided, the method comprising:

an inflow step of causing the fluid to flow into an inside of the case from the inflow port;

a heat transfer step of transferring heat from the actuator to the fluid flowing in from the inflow port;

a suction step of causing the recessed section to suck the fluid to which the heat is transferred from the actuator; and a compression step of compressing the fluid sucked by the recessed section.

\* \* \* \* \*